(12) United States Patent
McElroy et al.

(10) Patent No.: US 6,374,364 B1
(45) Date of Patent: Apr. 16, 2002

(54) FAULT TOLERANT COMPUTING SYSTEM USING INSTRUCTION COUNTING

(75) Inventors: James J. McElroy, Bellevue; Clark Johnson, Redmond, both of WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/234,797

(22) Filed: Jan. 19, 1999

Related U.S. Application Data

(60) Provisional application No. 60/071,914, filed on Jan. 20, 1998.

(51) Int. Cl.[7] .............................................. G06F 11/00
(52) U.S. Cl. ........................................ 714/10; 714/11
(58) Field of Search ............................... 714/10, 12, 25, 714/371, 11; 709/248, 400; 712/10, 200, 220; 713/400, 502; 700/2; 375/356

(56) References Cited

U.S. PATENT DOCUMENTS 5,317,726 A * 5/1994 Horst
5,845,060 A * 12/1998 Vrba et al.
5,896,523 A * 4/1999 Bissett et al.

FOREIGN PATENT DOCUMENTS

| EP | 0 447 576 | 9/1991 | ........... G06F/11/18 |
| WO | WO 92 22030 | 12/1992 | ........... G06F/11/16 |
| WO | WO 95 15529 | 6/1995 | ........... G06F/15/16 |

* cited by examiner

*Primary Examiner*—Gopal C. Ray

(57) ABSTRACT

In order to provide a microprocessor based fault tolerant computing system, hardware counters or event monitors that are normally included on the microprocessor chips are used to count application instructions that are being executed by the microprocessors. By counting the instructions and pre-empting the execution of the application program after a predetermined number of instructions have been executed, it is possible to cause the application programs to execute in congruent frames so that results from the application can be checked at congruent points of their execution. If the results do not match, then the program can be terminated or if a number of microprocessors are being used, the results can be voted on and the ones that match can be used in further computation by the system.

10 Claims, 5 Drawing Sheets

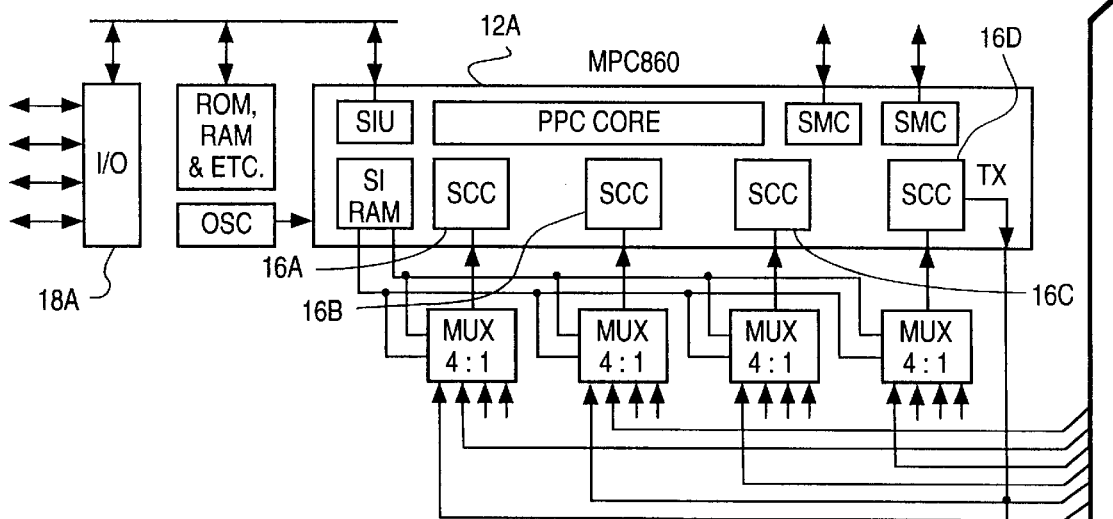
FIG. 1a
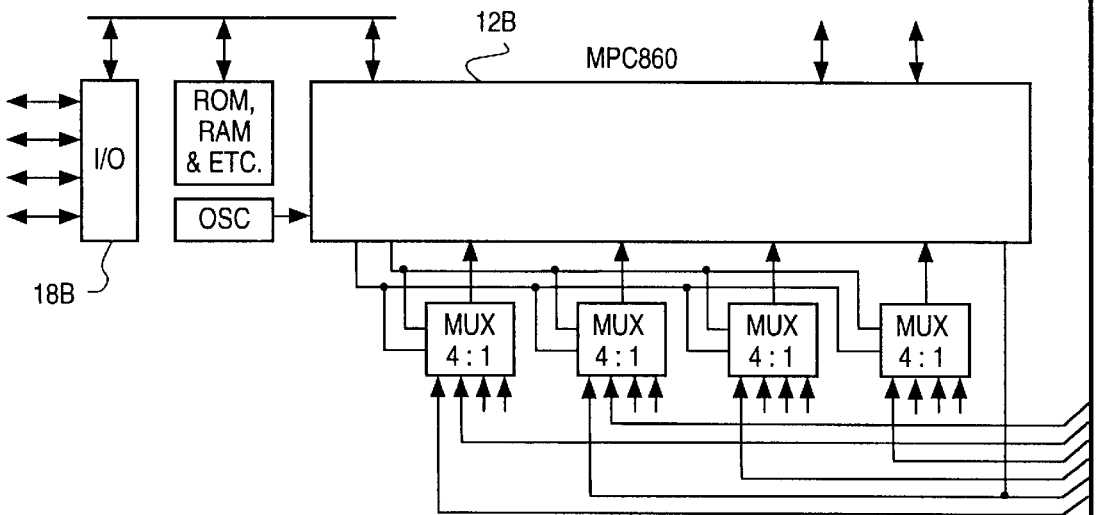
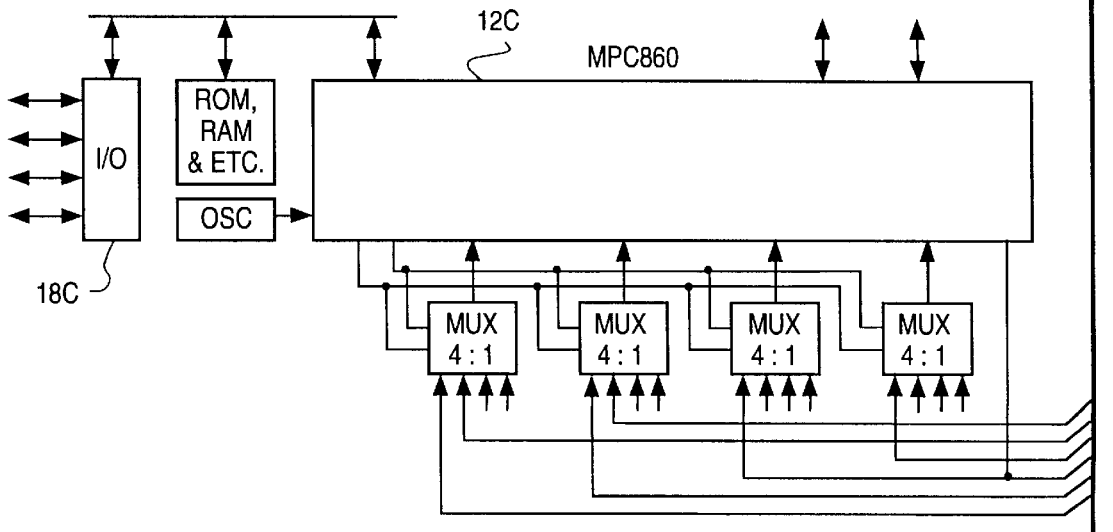

FAULT TOLERANT COMPUTING SYSTEM USING INSTRUCTION COUNTING

Systems to achieve fault tolerant computing have historically required special purpose hardware connecting several processors or else software design restrictions that greatly complicate the design and implementation of application software. Examples of such systems are described in U.S. Pat. Nos. 4,937,741; 5,388,242; 5,491,787; 5,537,655; and 5,588,111.

FIELD OF THE INVENTION

The invention relates to fault tolerant computing systems and in particular to fault tolerant systems where application programs are synchronized at the processor level.

BACKGROUND OF THE INVENTION

There is a need for a low cost but high performance fault tolerant computing system that does not greatly increase the difficulty of application software design. It is generally recognized that there is a need to employ digital computers in applications in which improper operation could have severe consequences. For example, a sophisticated flight hazard warning system has been developed for aircraft which utilizes a number of independent warning systems including a ground proximity warning system, a wind shear detection system and a collision avoidance system. This particular system is generally described in U.S. Pat. No. 6,002,347, filed Apr. 23, 1997 and entitled: "Integrated Hazard Avoidance System", and is incorporated herein by reference. In the preferred embodiment described therein, a central computer, which may include multiple processors for redundancy, receives via various input/output (I/O) modules various types of flight data useful for anticipating and warning of hazardous flight conditions. Such information may include but is not limited to: barometric altitude, radio altitude, roll and pitch, airspeed, flap setting, gear position, and navigation data. This information is communicated to the central computer via a data bus.

For such an integrated warning system to provide warnings with a high degree of integrity, the data operated upon and instructions issued by the central computer must be accurate. A bus architecture to transfer data between each of the I/O modules must be accurate. A bus architecture to transfer data between each of the I/O modules in an orderly manner must therefore exist. Data placed on the bus must also be accurate and without error. Also, it is important to ensure, to the extent possible, that the individual systems execute the warning programs correctly.

There have been various approaches to solving these problems. For example such a system is described in ARINC Specification 659 entitled Backplane Data Bus published on Dec. 27, 1993 by Aeronautical Radio, Inc. In this system the bus includes four data lines and has a pair of Bus Interface Units("BIU")for each processor or node on the data system where each BIU is connected to two data lines in the bus. Data is transferred according to a time schedule contained in a table memory associated with each BIU. The tables define the length of time windows on the bus and contain the source and destination addresses in the processor memory for each message transmitted on the bus. These types of systems also use for some applications two processors that operate in a lock-step arrangement with additional logic provided to cross-compare the activity of the two processors. The two processors, each with its own memory, execute identical copies of a software application in exact synchrony. This approach usually requires that the two processors must be driven by clock signals that are synchronized.

Although such systems have high data integrity and provide for fault tolerant operation, they have a number of disadvantages. For example the use of tables having data source and destination addresses for each application program in the processor memory makes it difficult to reprogram the system for new applications because each table in the system must be reprogrammed. In addition, the use of two processor operating in lock-step reduces the flexibility of the system since it is not possible to run two different programs on the processors at the same time.

SUMMARY OF THE INVENTION

This invention provides a way of using hardware facilities that are part of commercially available microprocessors together with control software to implement a fault tolerant computing system. Using the technique of this invention, a robust fault-tolerant computing system can be built. Application software that executes on the system can remain simple because it does not need to be aware of the measures taken to achieve the fault-tolerant characteristics of the system, that is, no special redundancy management code is built into application code. The redundancy management code is entirely at the operating system level. In addition, the application software does not need to adhere to restrictive design rules to allow the system's fault detection and containment mechanisms to work. The invention thus provides a way to separate the concerns of fault tolerance mechanisms and application logic. This makes it much easier and therefore less expensive to build robust fault tolerant computing systems.

This invention has commercial value because it allows strong and robust fault tolerant computing systems to be built with low cost commercial off the shelf components. For example, by using counters or event monitors that are built into the microprocessor chips, it is possible to count the instructions being executed in an application program so as to cause the application programs to execute in congruent frames. Therefore, systems built using this technology will have a substantial advantage over systems built with fault tolerant architectures that require custom electronics, custom integrated circuits or tricky and expensive application software design techniques.

This invention is also valuable because it uses technology that will be enhanced and extended as part of the natural growth path of microprocessor technology. Future microprocessors and microcontrollers now on the drawing boards having hardware that can be used to monitor the execution of application programs will almost certainly increase the advantage of this approach to fault tolerant systems.

and

Figure 4:
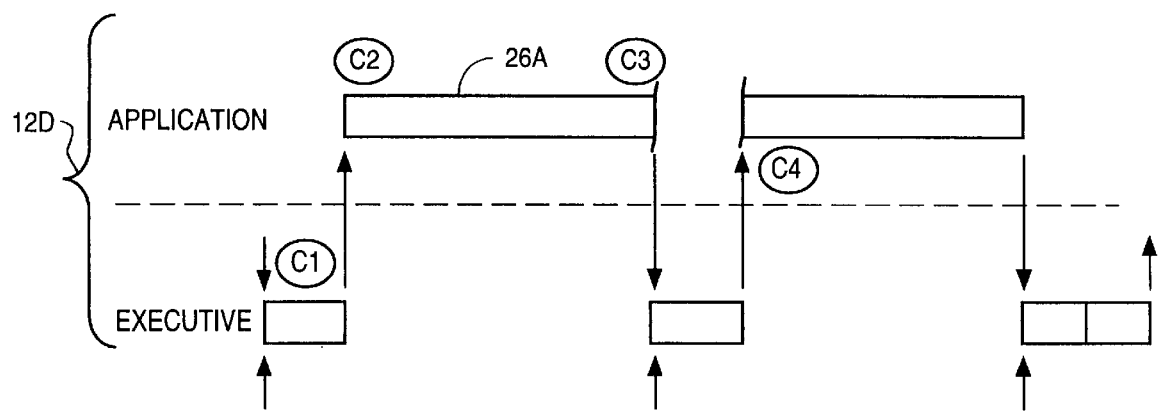
Figure 4:
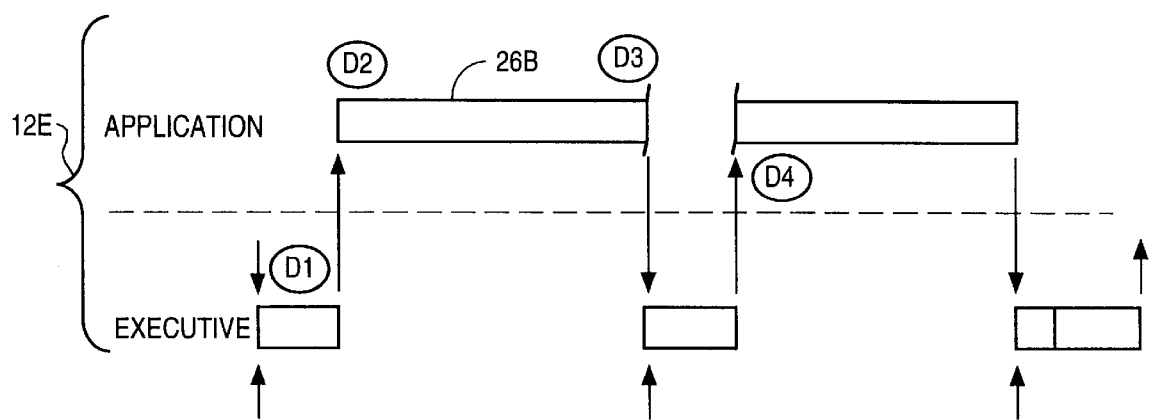

FIG. 4 is a timing diagram illustrating loose synchronization of microprocessors according to the invention.

DETAILED DESCRIPTION OF THE PREFERRED EMBODIMENTS

The following description of the preferred embodiment of the invention utilizes as an illustrative example the MPC860 microcontroller manufactured by Motorola although the invention is not restricted to the use of this particular microprocessor.

This microcontroller includes a 32-bit microprocessor which is a variant of the IBM/Motorola PowerPC architecture together with a second processor called the Communications Controller (CP). The component also includes 8 serial I/O adapters integrated on-chip with the processor; of these, four are of similar type and are referred to as Serial Communications Controllers (SCCs).

The PowerPC part of the component includes a Memory Management Unit (MMU) that supports page level memory allocation and relocation. The MMU is able to treat physical memory as a range of pages of 4096 bytes. Each page is simply a range of addresses of 4096 bytes length. When the MMU is enabled, the code that is executing in the processor identifies an address space consisting of pages having locations which are controlled by the MMU. The MMU is capable of making various pages accessible or inaccessible to the executing code. In addition, the MMU may alter the address ranges where the executing code "sees" each page of physical memory (relocation).

These features allow the implementation of a system in which applications execute in a user mode and an operating system or executive executes in a supervisor mode. The executive software is able to cause the applications to execute in a controlled environment and also can provide services to the applications.

A feature of the invention involves the use of a processor hardware feature that can preempt (interrupt) executing application code after a precise number of instructions have been executed rather than the usual method of preempting executing code after a predetermined amount of time has elapsed. As explained below, this capability allows essentially unrestricted application software architectures to be used with the system. The use of this feature has very significant advantages in implementing fault tolerant computing systems.

FIG. 1 shows an example of a fault tolerant computing system 10 having a group of six microprocessors 12A–F, such as MPC 860, that can be programmed.

Figure 1B:
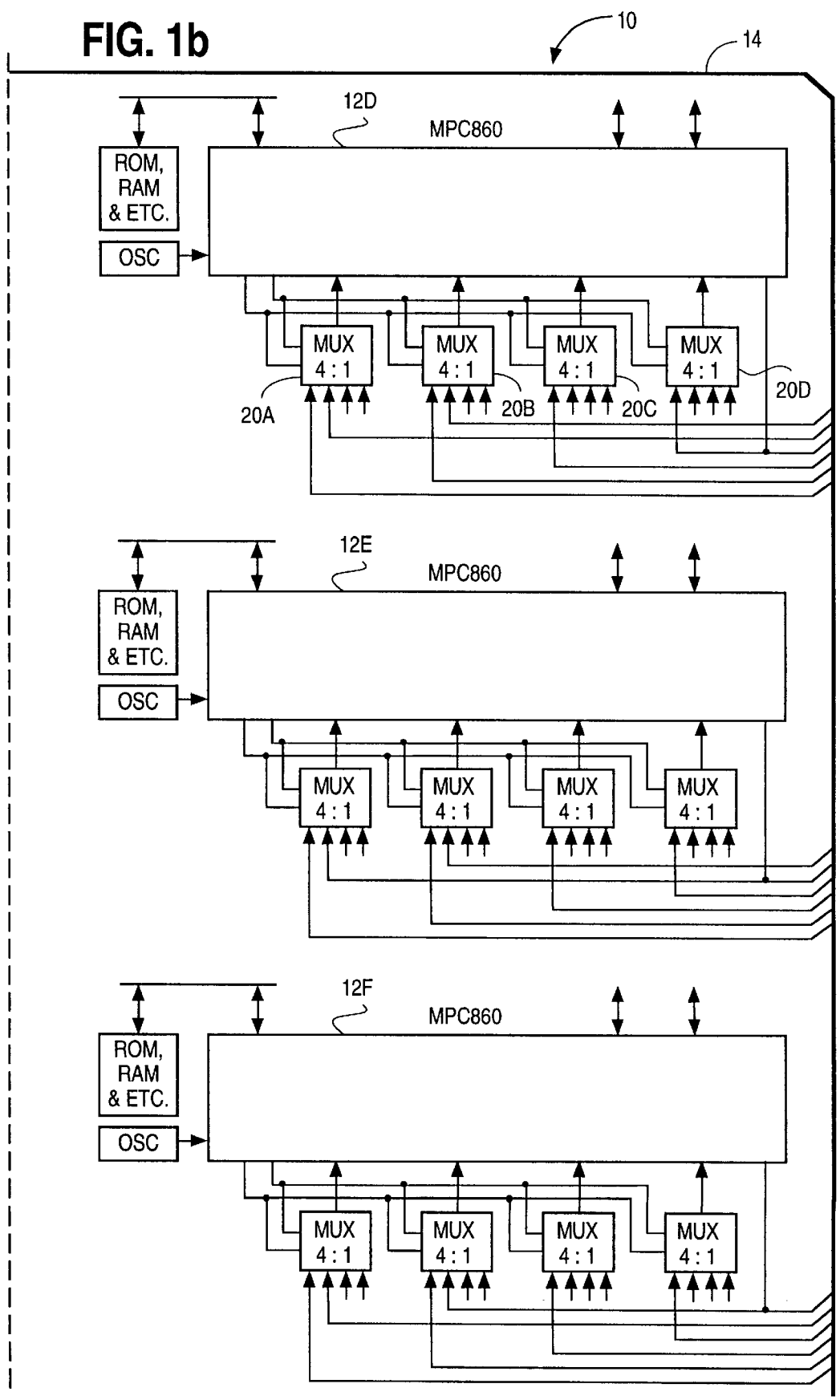
FIG. 1 comprising FIG. 1a and FIG. 1b is a block diagram of fault tolerant computing system according to the invention.

With appropriate software that makes use of the invention. Each of the microprocessors 12A–F is able to communicate with all others by means of a group of serial buses indicated at 14, using a set of Serial Communications controllers (SCCs) 16A–D that are incorporated on the microprocessors 12A–F with the microprocessor cores. The three microprocessors 12A–C in FIG. 1a are also connected to external devices by means of an I/O circuit 18A–C as needed for the application. The microprocessors 12A–C are thus able to take care of the input/output functions of the system 10 while the microprocessors. 12D–F in FIG. 1b are able to perform processing duties, obtaining input and returning output to the microprocessors 12A–C on the left.

In this embodiment, each of the microprocessor 12A–F drives only one of the serial busses 14, but is able to receive from all of the serial busses 14. Also, each of the microprocessors 12A–F has only four SCCs 16A–D. Therefore, the microprocessors 12A–F are not capable of obtaining data simultaneously from more than four of the microprocessors 12A–F. For this reason, a set of four multiplexer circuits 20A–D are added external to each of the microprocessors 12A–F to enable them to obtain data from all the microprocessors 12A–F in a time-sequenced manner. Software at the executive level in each of the microprocessor 12A–F is used to synchronize and sequence the communications between the microprocessors 12A–F.

With 4-to-1 multiplexers 20A–D as shown in FIG. 1, up to sixteen microprocessors could be used in a system.

Figure 2:
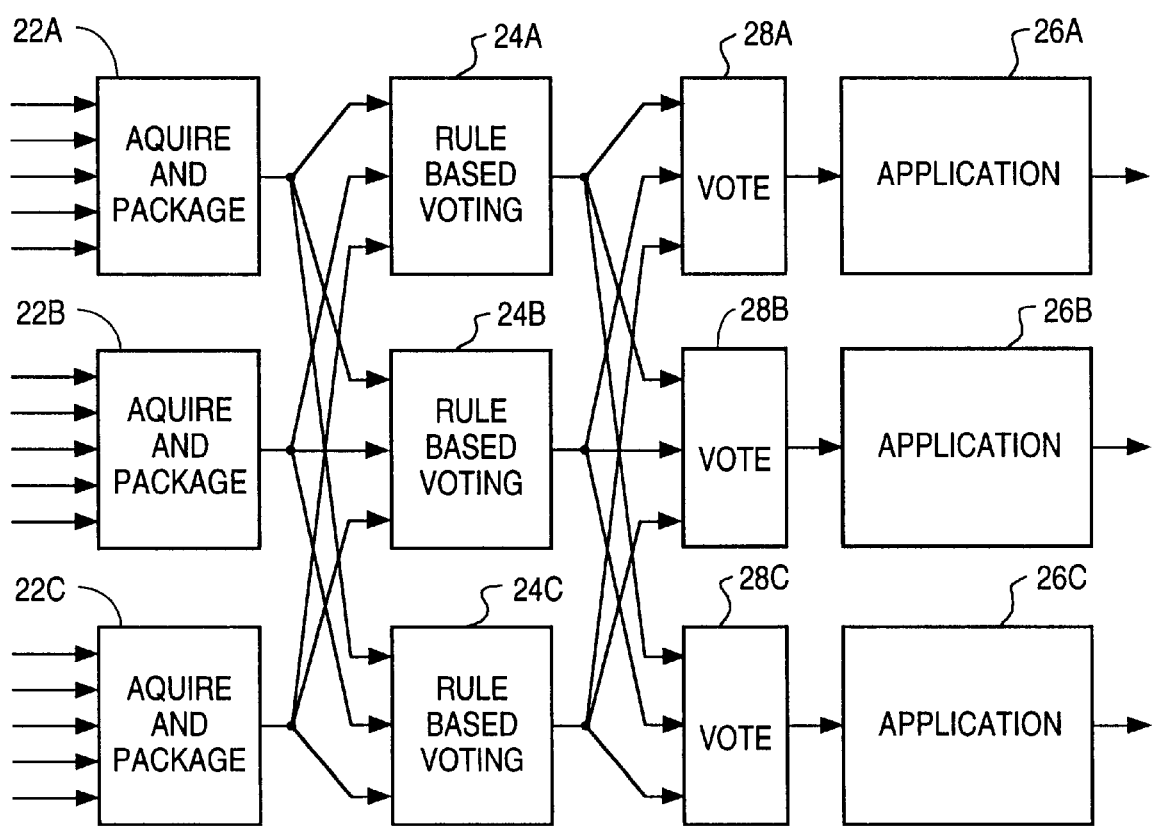
FIG. 2 is a logic diagram of a data input function of the system of FIG. 1 according to the invention.

FIG. 2 illustrates in logical block diagram form three data input processing functions as might be implemented on the microprocessors 12A–C that have access to I/O signals from the I/O circuits 18A–C shown in FIG. 1. Each of these functions periodically sample signals from various sensors as indicated by a set of blocks 22A–C. These signals can be from redundant sensors but, in general, they need not be identical or even synchronized with each other. After sampling, the signals are sent for rule based voting as indicated by a set of function blocks 24A–C. The function indicated by the blocks 24A–C might be implemented in software executing on the same microprocessor 12A–C as the data input function in the blocks 22A–C or on different microprocessors in the system 10.

After the data exchange, each of the rule based voting functions 24A–C has access to all of the input signals from blocks 22A–C, both its own and those from the other microprocessors 12A, B or C. Rules are then applied to the available signal samples to determine which ones to select and how to make the best use of the available data. This function depends on the details of the input data and the sensors from which the data is obtained and would readily be apparent to those of ordinary skill in the art of data verification.

When the rule based voting functions 24A–C have finished processing a frame of data, they will have separately produced, in the absence of faults, three independent versions of the input data. The three versions of the input data in this embodiment will be loosely synchronized and bit-for-bit identical. This property makes fault containment much easier in the subsequent processing.

The next processing steps occur at some point between the output of the rule based voting identified by the blocks 24A–C and three identical application programs represented by a set of blocks 26A–C in FIG. 2 that make use of the incoming data from the sensors via the blocks 22A–C.

Figure 3:
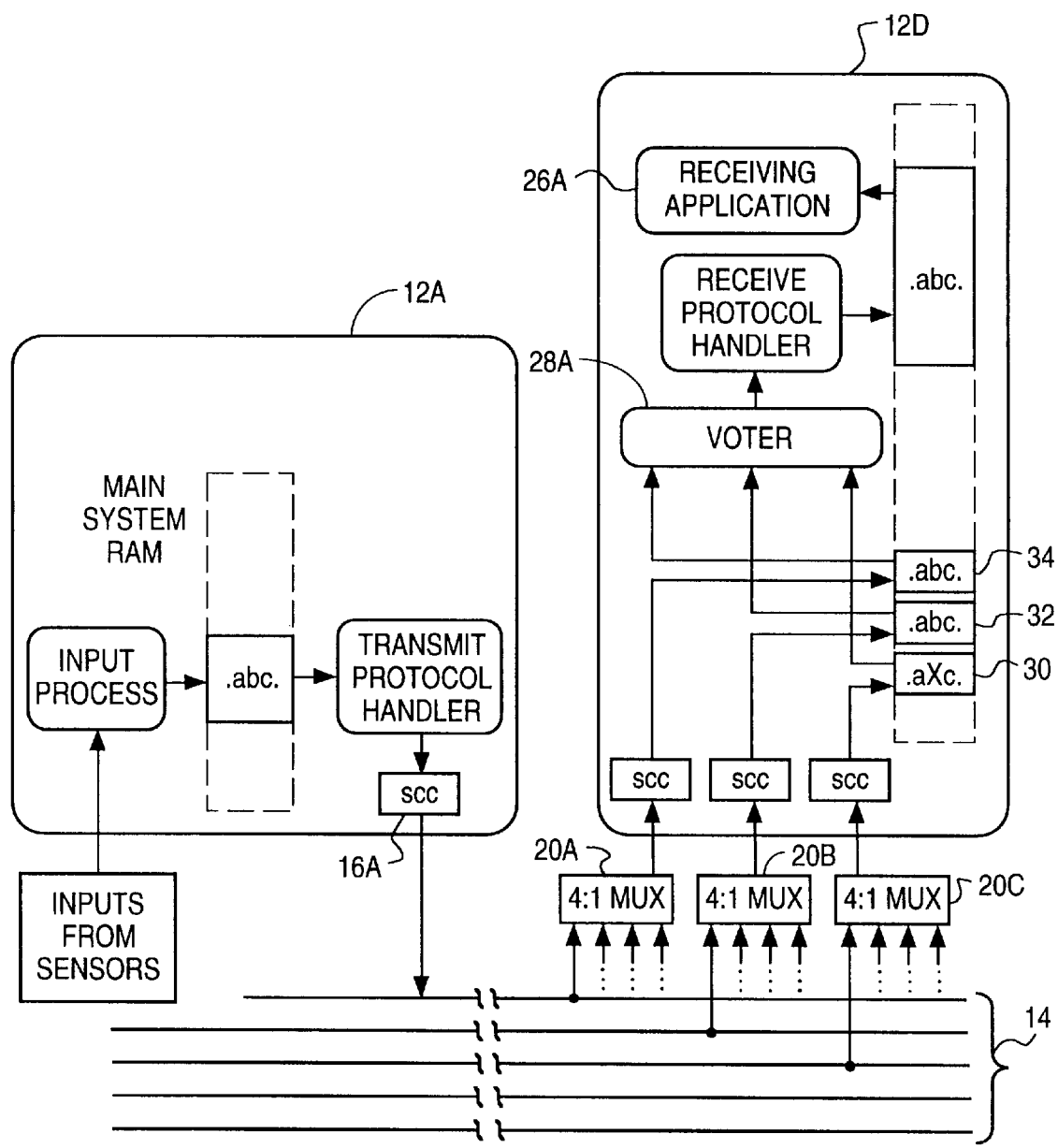
FIG. 3 is a logic diagram illustrating data verification in the system of FIG. 1.

Continued operation of the system 10 is explained in connection with the logic diagram of FIG. 3. After the input processing described above, the manner in which the rest of the system in this embodiment of the invention will detect faults and continue operation is as follows. As shown in FIG. 3, a transmitting processor, for example microprocessor 12A, executes one instance of the input processing function. This microprocessor 12A produces a sequence of output data sets that are then transmitted via that microprocessor's SCC 16A to the serial output bus 14. Also shown is a receiving processor, for example the microprocessor 12D, that is the host of one of the redundant instances of the receiving application 26A. Not shown in FIG. 3 are the other transmitting microprocessors 12B and C and the other receiving microprocessors 12E and F, but it should be understood that operation of these elements of the system 10 will be similar to the ones shown in this figure.

Here the receiving microprocessor 12D obtains the data from the transmitting microprocessor 12A on one of its serial input buses 14. At the same time, it receives data from several other transmitting processors 12B and C. The system 10 is preferably set up so that the data obtained from the several processors is loosely synchronized and congruent as long as there are no hardware faults in the system. With this arrangement, it becomes possible to use voting at the receiving microprocessors such as 12D–F to handle faults in the incoming data.

Voting consists of examining the incoming data and checking it to determine if all copies match exactly as indicated by a set of blocks 28A–C shown in FIGS. 2 and 3. If all the incoming data matches, then any version of the data can be used. If only two versions of the data match, then either of the matching versions can be used and the non-matching data is discarded as illustrated at 30 of FIG. 3. If there are no matches then the voter will be unable to determine which, if any, of the data sources should be trusted but for this to occur more than one failure must have occurred. Thus, the architecture of the system 10 can effectively operate with any single failure in the data input system and while providing loosely synchronized congruent data for use by subsequent application programs such as application programs 26A–C.

One of the most significant features of the invention permits the software applications such as 26A–C to be executed in the microprocessors 12D–F in such a way that it becomes possible to check the execution of those applications 12A–C, and to reject any that produce faulty outputs, without the necessity of designing or implementing application programs with fault tolerance in mind. It should be noted that the assumption in this description of the invention is that the faulty output would occur because of a hardware processing fault not a software fault. As discussed below, system verification is accomplished by comparing the results from one instance of the application executing on one processor with the results from another identical instance of the application executing on another processor.

The voter 28A now selects any one of the input message blocks that has the maximum number of matches in agreement with other message blocks. In the example shown in FIG. 3, a second 32 or a third message block 34 might be selected because the first message block 30 contains an error. To summarize the data selection for the application programs 12A–C, the following steps are taken in the preferred embodiment of the invention:

1. Incoming messages are received from multiple sources and stored.
2. A selection from among the various inputs was made by software external to the Receiving Application. This software is controlled by, or is part of, the operating system software in the preferred implementation.
3. The receiving application is not aware of the message selection made and does not take part in any way in accomplishing voting or redundancy management on its own. Therefore, its logic is not made more complicated by redundancy management issues.
4. Testing and proving such a system, such as certification for use on an aircraft, is made simpler and less expensive because the fault tolerant aspects of the system can be understood, tested and proven independently of the complexities of the application software.

It should be noted that data message from the transmitting processors 12A–C need not be tightly synchronized. However, it is desirable in this particular embodiment that the voters 28A–C wait until all the messages have arrived or should have arrived before voting; therefore loose synchronization is needed. For example, it can be required that non-failed data sources deliver their data messages before a predetermined time has expired.

In the fault tolerant system of the invention, it is desirable to insure that new data is presented to the several redundant application programs 26A–C only at points in the programs' execution that is the same on all processors. In other words, it is desirable to synchronize the operation of the microprocessors 12D–F during the processing of the application programs. As described above, this can be done by one of several methods. For example:

1. Restrict the software design of the application so that data reading only occurs at points in the program execution that can be controlled relative to the points where the program is preempted. In this case, the software application designer must understand and take into account the method of obtaining fault tolerance.
2. Restrict the software design of the application so that it executes in "frames" or "steps" that run to completion each time the application is started. No new data is provided to the program once it starts executing. New data is provided only between steps.
3. Add hardware to the system that forces the processors to run in "lock step" on an instruction by instruction basis. This, of course, provides for a system that always provides data to the several applications at the same points in program execution even if data is continuously arriving.

However, each of these synchronization approaches has drawbacks that can add substantial complexity to either the hardware or the software design.

To overcome these disadvantages, hardware features that are present on certain types of microprocessors such as the MPC860, as described below, can be used to maintain loose synchronism of the microprocessors while they independently execute the same application program. This method of maintaining the congruence of redundant applications on several loosely synchronized processors can be summarized as follows:

1. Set up congruent input data for each of the redundant programs on the several microprocessors as described above.
2. Start execution of the application program in each microprocessor at known points either at a standard start up point or at the instruction following a congruent preemption which preferably will be made to occur after the same instruction on all the microprocessors.
3. Count executed instructions from the start point, and when a suitable number of instructions have been executed, preempt or interrupt the application program on the microprocessor. This is defined as a "congruent preemption".

This method is similar to the run to completion frames mentioned above, but the frames are in effect created at run time. There is no need for the application software designer to know or care how the fault tolerant characteristics of the system are achieved.

FIG. 4 provides, in a timing diagram form, an illustration of the two microprocessors 12D and 12E executing a common application program utilizing congruent preemption under the control of an operating system according to the preferred embodiment of the invention. In this example, the executive or operating system of both microprocessors 12D and 12E are running at points C1 and D1 respectively. At approximately the same time, C2 and D2, the executive causes the application programs 26A and 26B to begin to execute. After a predetermined count are to be transmitted to another system, the results can be voted on to insure an accurate output. Then after the executives in each of the microprocessors 12D and 12E complete their tasks, they initiate a resumption in the application programs 26A and 26B at points C4 and D4. This process continues indefinitely or until the application programs 26A and 26B are completed. In this manner the applications, 26A–26C can be made to execute in congruent frames.

It should be understood that with this method of counting instruction executions, or instruction completions, the application programs will, in general, be interrupted at somewhat different times on the several microprocessors, but the last instruction to complete will correspond on each processor at each congruent preemption. Once this has been accomplished, it is easy to guarantee that all application programs will start again on a corresponding instruction, regardless of how they are programmed.

This method makes use of built-in hardware on the microprocessor chip that is usually used for other purposes such as debugging the chip to count the instructions executed in the application program. A number of commercially available microprocessors including the Motorola MPC860, the MPC823, the 604e and the 750 contain suitable hardware to perform this function. The MPC860 for example has a subsystem that was designed as an aid to software development and debugging that is called "Development Support" by Motorola. It includes eight internal comparators that can detect various events that occur during instruction execution. It also includes two 16-bit counters that are capable of counting events. Use of this subsystem for counting instruction completions involves setting up the comparators to detect instructions executed within a desired address range, for instance the address range where the application being monitored is located, and setting up a counter to count the number of events detected. When a predetermined number of counts is reached, the processor will "trap" to an executive routine.

The models 604e and the 750, contain a different mechanism, but one that can also be put to the same use. In these processors there is a subsystem referred to as the "Performance Monitor". This facility was designed into the processors to provide the ability to monitor and count predefined events such as processor clocks, misses in the instruction cache, data cache, or L2 cache, the types of instructions dispatched, mispredicted branches and other events. In particular, it is possible to set up the event "Performance Monitor". This facility was designed into the processors to provide the ability to monitor and count predefined events such as processor clocks, misses in the instruction cache, data cache, or L2 cache, the types of instructions dispatched, mispredicted branches and other events. In particular, it is possible to set up the event monitor system to take a "Performance Monitor Interrupt" after a predetermined number of application program instruction completions.

Other microprocessors have similar capabilities. Also, as microprocessors become more complex and as the amount of logic on the processors increases, the need for features to assist with debug and performance measurement increases. For these reasons, it is likely that in the future more and more microprocessors will include a mechanism capable of counting instruction completions. Such microprocessors may then be used in fault tolerant architectures of this type.

It will be understood that there are a variety of ways of implementing the invention described above. The system disclosed in the U.S. Provisional Patent Application Serial No. 60/071,914 filed on Jan. 20, 1998 and assigned to the assignee of this application and hereby incorporated by reference in this application, provides an example of such an implementation.

Thus, by using instruction completion counters in microprocessors instead of time for preempting the execution of an application program in combination with organizing input data into packages that are congruent across the several microprocessors that will be executing the redundant instances of the application program, it is possible to create a fault tolerant system which is comparatively inexpensive as well as transparent to application programmers.

We claim:

1. A fault tolerant computing system comprising:
a plurality of microprocessors each having a substantially identical application program and each having an executive program;
data input means for applying the same data to said microprocessors;
count means located in each of said microprocessors for counting each instruction of said application program executed by said microprocessors;
start means associated with said executive program for starting said application program on each of said microprocessors at approximately the same time;
preemption means associated with said executive program and responsive to said count means for halting said application program on each of said microprocessors after a predetermined number of said instructions of said application program have been executed;
comparison means for comparing the results of said application programs after said predetermined number of instructions have been executed; and
resumption means associated with said executive program for resuming the execution of said application program on each of said microprocessors.

2. The system of claim 1 wherein said count means includes a counter in each of said microprocessors for counting said application instructions executed by said microprocessors.

3. The system of claim 1 wherein said count means includes an event monitor in each of said microprocessors for counting said application instructions executed by said microprocessors.

4. The system of claim 1 wherein said preemption means and resumption means cooperate to complete the execution of said application program on each of said microprocessors.

5. The system of claim 4 wherein there are at least three of said microprocessors and additionally including voting means operatively associated with said comparison means for selecting matching results of said application programs.

6. The system of claim 4 wherein said data input means includes voting means associated with each of said microprocessors for selecting accurate data from a plurality of data sources.

7. A method for fault tolerant computing utilizing a plurality of microprocessors each having a hardware counter comprising the steps of:
inputting the same application program into each of the microprocessors;
inputting congruent data into each of the microprocessors;
starting execution of said application program in each of said microprocessors at approximately the same time;
counting the number of the instructions of said application program executed by the microprocessors using the hardware counter in the microprocessors;
halting said execution of said application program in each of the microprocessors after a predetermined number of said instructions have been executed as determined by the counter;
comparing the results of said application program from each of said microprocessors and if said results are the same, resuming execution of said application program on the microprocessors.

8. The method of claim 7 additionally including the step of voting after said comparison of the result of said application program to select the result that are the same and resuming execution of said execution of said application program only on the microprocessors that produced the selected result.

9. The method of claim 7 wherein after said comparison including the step of outputting the result of the application program from the microprocessor to another system.

10. The method of claim 9 including voting on the results of said application program to select the result from at least two microprocessors that are the same for output to said other system.

* * * * *